United States Patent [19]

Antes

[11] Patent Number: 4,501,439
[45] Date of Patent: Feb. 26, 1985

[54] DOCUMENT HAVING A SECURITY FEATURE AND METHOD OF DETERMINING THE AUTHENTICITY OF THE DOCUMENT

[75] Inventor: Gregor Antes, Zurich, Switzerland

[73] Assignee: LGZ Landis & Gyr Zug AG, Zug, Switzerland

[21] Appl. No.: 425,466

[22] Filed: Sep. 28, 1982

[30] Foreign Application Priority Data

Oct. 27, 1981 [CH] Switzerland ............... 6835/81

[51] Int. Cl.³ .................. B42D 15/00; G02B 27/38
[52] U.S. Cl. ............................ 283/91; 283/94; 283/904; 283/86; 356/71
[58] Field of Search ............... 283/91, 85, 86, 70, 283/901, 904, 94; 235/380, 382, 487, 492; 356/71

[56] References Cited

U.S. PATENT DOCUMENTS

| | | | |
|---|---|---|---|
| 3,571,957 | 5/1971 | Cumming et al. | 283/70 |
| 3,614,430 | 10/1971 | Berler | 283/70 X |
| 4,092,526 | 5/1978 | Beck | 283/82 X |
| 4,119,361 | 10/1978 | Greenaway | 283/82 X |
| 4,129,382 | 12/1978 | Greenaway | 356/71 |
| 4,140,373 | 2/1979 | Rüll | 283/70 X |
| 4,142,674 | 3/1979 | Walton | 235/487 X |
| 4,184,700 | 1/1980 | Greenaway | 283/901 X |
| 4,211,918 | 7/1980 | Nyfeler et al. | 235/487 X |
| 4,290,630 | 9/1981 | Lee | 283/82 |

FOREIGN PATENT DOCUMENTS 2082593  3/1982  United Kingdom .

Primary Examiner—Paul A. Bell
Attorney, Agent, or Firm—Ernest F. Marmorek

[57] ABSTRACT

In a security blank which includes a substrate which has two major surfaces, a thermoplastic layer which has a predetermined refraction index and is suitable for embossing thereon a machine-readable authenticity feature in the form of an optical microstructure, and a transparent layer which has a prearranged refraction index for covering and protecting the microstructure, and wherein the prearranged refraction index has a value different from the predetermined refraction index, and the microstructure generates a characteristic diffraction effect from light incident thereonto, the improvement includes a surface of the substrate facing the thermoplastic layer, which has within a region of the microstructure diffuse reflection characteristics of a predetermined magnitude, and wherein the thermoplastic layer is transparent, and wherein the difference between the refraction indexes is sufficiently small, and the magnitude of the diffuse reflection characteristics is sufficiently large, so that the characteristic diffraction effect of the microstructure is not normally detectable by the eye of an observer.

6 Claims, 11 Drawing Figures

DOCUMENT HAVING A SECURITY FEATURE AND METHOD OF DETERMINING THE AUTHENTICITY OF THE DOCUMENT

CROSS-REFERENCE TO RELATED APPLICATIONS

Reference should be had to copending application entitled "An Apparatus and a Method of Testing the Authenticity of Documents", assigned to the assignee of the present invention.

BACKGROUND OF THE INVENTION

Most of the documents in use today, for example, bank notes, credit cards, identity cards, railroad and airline tickets, checks and the like can be forged by means of modern reproduction processes at not too great an expense. Many proposals have been made, the object of which is the recording of authenticating features on such documents, which increase the cost of an attempted forgery and therefore reduce the probability of any forgery. A low probability of forgery is attained, if authenticating features are incorporated in the document in the form of optical microstructures, which diffract light in a characteristic manner. Such microstructures, such as, for example, holographically generated structures, phase diffraction gratings and kinoforms can only be manufactured at a high technical expense.

In documents having a substrate of thermoplastic material, the microstructures are embossed directly onto the substrate, as disclosed, for example, in British Patent No. 1,502,460. Paper documents are coated with a thin thermoplastic layer prior to the embossment of the documents with microstructures, as disclosed, for example, by Greenaway in U.S. Pat. No. 4,184,700. The microstructure can be protected from mechanical damage by means of a protecting layer in the form of a laminated foil, as disclosed, for example, by Greenaway, in U.S. Pat. No. 4,119,361, or by means of a lacquer layer, as disclosed for example, in G.B. Patent Application No. 2,082,593. The protective layer may also be impenetratable for visible light to hide the microstructure from view, as disclosed, for example, by Greenaway in U.S. Pat. No. 4,119,361; an opaque or dark protective layer of this kind is not, however, desirable in many cases, on one hand, for aesthetic reasons, and secondly, because it may provide a strong hint that the document carries therewithin a hidden authenticating feature. From Greenaway, U.S. Pat. No. 4,184,700, there is also known a document in which the protective layer has a different diffraction index than the thermoplastic embossment layer.

When subjecting such documents to a test to determine their authenticity, the microstructure is illuminated by a directional light ray, which has a predetermined wavelength, or a predetermined narrow wavelength region. One or several components of the light rays diffracted by the microstructure are sensed by a light sensing arrrangement, and an electronic evaluator or processor tests whether the intensity or the intensity ratio of these components lies or lie within expected limits, as taught, for example, by Greenaway, in U.S. Pat. No. 4,129,382. From Nyfeler, et al., U.S. Pat. No. 4,211,918, it is also known to embed a certain sequence of microstructures diffraction from one another in a document, and to test during authenticity examination, whether the sequence stored in the document coincides with a desired sequence stored in a read device.

SUMMARY OF THE INVENTION

One of the principal objects of the present invention is to create a document, particularly a document with a substrate which may not be ideal optically, in which the authenticating feature is not only not visible, but is also hidden within the document without attracting any attention. It is a further object of the invention to devise a method in which the presence of such authenticating features can nevertheless be proven with a high degree of reliability.

This object is attained in a security blank including a substrate having two major surfaces, a thermoplastic layer having a predetermined refraction index, and suitable for embossing thereon a machine-readable authenticity feature in the form of an optical microstructure, and a transparent layer having a prearranged refraction index for covering and protecting the microstructure, the prearranged refraction index having a value different from the predetermined refraction index, and wherein the microstructure generates a characteristic diffraction effect from light incident thereonto, by providing a surface of the substrate facing the thermoplastic layer having within a region of the microstructure diffuse reflection characteristics of a predetermined magnitude, and wherein the thermoplastic layer is transparent, and the difference between the refraction indexes is sufficiently small, and the magnitude of the diffuse reflection characteristics is sufficiently large, so that the characteristic diffraction effect of the microstructure is not normally detectable by the eye of an observer.

Other objects of the invention will in part be obvious, and will in part appear hereinafter,

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PREFERRED EMBODIMENTS

Figure 1:
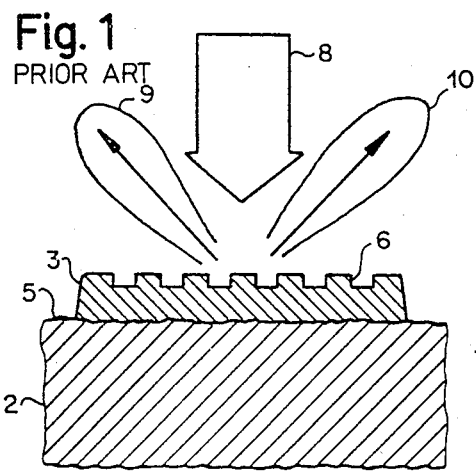
FIG. 1 is a cross-section of a document without any protective layer of the prior art.
Figure 2:
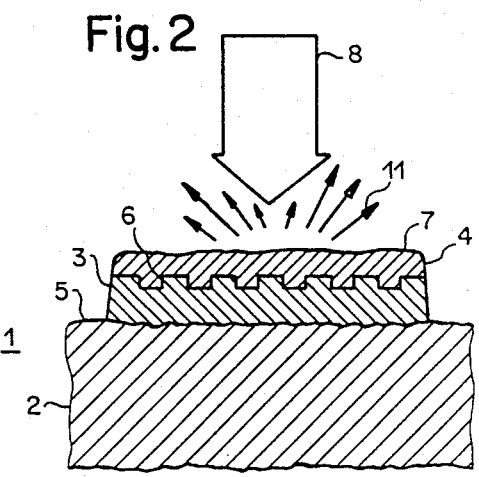
FIG. 2 is a cross-section of a document according to FIG. 1, but provided with a protective layer.

Referring now to the drawings, and in particular to FIGS. 1 and 2, there is shown a security blank such as document 1, which may, for example, be a bank note, a credit card, an identity card, a railroad ticket or an airline ticket, a check or the like, and which consists of a substrate 2, a thermoplastic transparent layer 3 suitable for embossing a structure thereonto, and a transparent protective layer 4, shown in FIG. 2. The layer 3 covers one of the surfaces 5 of the substrate 2 at least partially. The layer 3 may, for example, have the form of a small strip, an annulus, or a circle. An optical microstructure 6 is embossed on the layer 3, causing a characteristic diffraction of light impinging thereon, which represents an authenticating feature of the document 1, and may be formed by one or several holograms, diffraction gratings, or kinoforms arranged at a certain sequence within the document 1. The protective layer 4 is applied onto the layer 3 following embossment of the microstructure thereonto and may, for example, be a lacquer layer. An inner surface of the protective layer 4 completely abuts the embossment layer of the microstructure 6, while its outer surface 7 is smooth or slightly wavy. A typical thickness of the embossment layer 3 is about 10 microns, and that of the protective layer 4 about 3 microns.

As both the embossment layer 3, as well as the protective layer 4 are transparent, the microstructure 6 borders the layers of two optically dielectric media. In order for the microstructure 6 to be optically effective, the refractive index $n_1$ of the protective layer 4, and the refractive index $n_2$ of the embossment layer 3 differ from one another. The surface 5 of the substrate 1 facing the embossment layer 3 has diffuse refraction characteristics of high reflectivity at least within the region of the microstructure 6, namely both above-mentioned optically dielectric media are disposed on a light background, the surface of which is rough.

If a light ray 8 is directed, according to FIG. 1, onto the microstructure 4 not yet covered by a protective layer, and if the light ray impinges on the microstructure approximately at right angles with the surface thereof, then a clearly defined diffraction maximum 9 or 10 appears in at least one predetermined direction. Upon illumination with white light, the diffraction effect is visible to the human eye, for example, by a clearly defined rainbow effect, which is somewhat disturbed by diffuse scattering from the surface of the substrate 5, but is nevertheless clearly visible.

In order to hide the authenticating feature defined by the microstructure 6 from the human eye, on the one hand, the difference in the refractive indices $n_2 - n_1$ is sufficiently small, and on the other hand, the diffuse reflectivity of the surface 5 of the substrate is sufficiently large, so that the diffractive effect of the microstructure 6 is no longer visible to the human eye. Thus the intensity of the diffractive effects is lowered below the visibility limit, and the eye recognizes only scattered light 11 reflected from the surface 5 of the substrate (FIG. 2) which appears as a sufficiently strong disturbing signal, so that the effective signal defined by the diffraction maxima 9 and 10 (FIG. 1) is submerged, as far as visibility to the eye is concerned, within the disturbing signal. Furthermore, the reflected scattered signal 11 is subject to local fluctuations (for example, when the substrate 2 consists of paper such as white paper,) which further masks the diffractive effects of the microstructure 6. As the embossment layer 3 and the protective layer 4 are very thin and transparent, they do not appear as such to an observer, and do not give rise to any suspicion that an invisible authenticating feature is hidden between these layers.

If the diffuse reflectivity of the surface of the substrate 5 is at least 80%, then the diffraction effects are below the limit of visibility, if the difference between the refractive indeces $n_2 - n_1$ is at most 0.2. If the difference between the refractive indeces is further reduced, for example, to a value 0.1, then it is possible to ensure that the diffraction effects are far below any visibility limits of the human eye, and automatic detection of the authenticity feature then becomes only possible by using special methods further described hereinafter.

It is advantageous if the substrate 2 is made of paper, which is white in the region of the microstructure 6, and substantially does not carry any print, and whose natural surface characteristics are such that it has the required reflection characteristics. Furthermore, the substrate 2 can be a synthetic material having a metallized surface.

An additional masking of the authenticating feature can be obtained by the covering layer 4 being provided with a slightly wavy surface 7, which diffuses light impinging thereon, so that it acts as a partial diffusor. The wavy surface 7 is effective on one hand, both upon the light rays 8 impinging thereon, as well as following diffraction of the light rays. On the other hand, the spatial angle within which the surface 7 appears glossy is widened.

A further masking of the authenticating feature can be obtained by the surface 5 of the substrate having a varying degree of matness within the region of the microstructure 6 in different zones thereof.

It is advantageous if the microstructure 6 is implemented in such a manner that during scanning thereof by the directional light ray 8 there appear simultaneously diffraction maxima 9 and 10 in several predetermined directions, which, for example, are grouped around an optical axis. By this means, a further masking of the authenticating feature may be obtained, for at most only one of the weakened partial signals can reach the eye of an observer, while by an appropriate number of light sensors disposed along several predetermined directions all partial signals may be received and again summed be means of an electronic adder to arrive at the total signal.

A further masking of the authenticating feature can be obtained if the microstructure consists of a plurality of individual phase diffraction means, for example phase gratings or holograms, wherein each phase diffraction means is small enough in at least one dimension so that the individual phase diffraction means cannot be resolved by the unassisted human eye. This feature may be obtained if the dimensions of the phase diffraction means in one dimension are at most 0.1 mm. On the other hand, the phase diffraction means should be sufficiently large so that the diffraction maxima are not unduly widened. A phase diffraction grating should, for example, consist of at least five grating lines.

If the diffraction effects are further considerably below the limit of visibility, the information-carrying diffraction signals may be so weak in the presence of any strong and non-information carrying diffuse reflection signals, that a single diffraction maximum can no longer be reliably detected automatically by means of a machine. The microstructure 6 is therefore advantageously formed so that during scanning thereof by a directional light ray in at least one predetermined direction there appear in a predetermined time sequence diffraction maxima, if the document 1 is moved at a predetermined velocity in translation or rotation. During examination for authenticity of such a document with an automatically operating read device, the diffraction maxima may be detected by means of a light sensor, and the time sequence of the electrical signals of the light sensor may be compared by means of an electronic evaluator with a desired sequence, the diffraction maxima of the effective components may be summed and compared to those of the desired sequence, while any disturbing components or signals caused by diffuse reflections, and not corresponding to the required sequence are suppressed. This will be further illustrated below in what follows.

Figure 3:
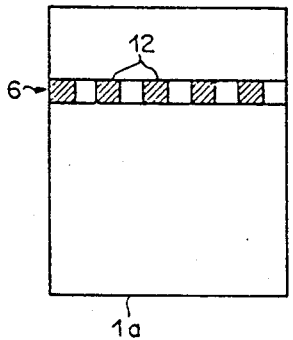
FIG. 3 is a plan view of a first version of the document, according to the present invention.
Figure 4:
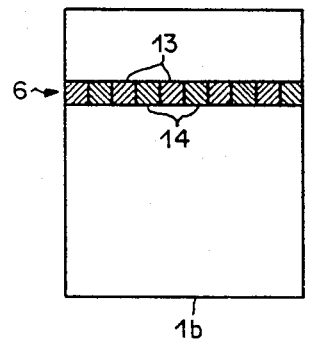
FIG. 4 is a plan view of a second version of the document, according to the present invention.
Figure 5:
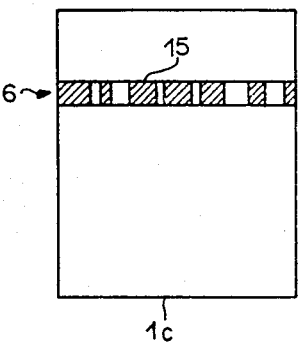
FIG. 5 is a plan view of a third version of the document, according to the present invention.

In FIG. 3 there is shown a document 1a, whose microstructure 6 consists of a plurality of similar holograms 12, which are disposed at regular distances from one another in a row. The microstructure 6 of the document 1b shown in FIG. 4 is formed by two different types or patterns of holograms 13 and 14, which alternate with one another. The document 1c, according to FIG. 5, includes a microstructure 6 made up of a plurality of holograms 15 of a similar type, which have, however, different respective lengths, and are disposed at different respective spacings from one another in a row. During scanning of the microstructure 6 of documents 1a, 1b and 1c by a directional read-beam, there appear in at least one predetermined direction in a prearranged time sequence diffraction maxima, if the document is moved at a predetermined velocity in translation in the direction of the row of holograms. In the case of the documents 1a and 1b the sequence is periodic, while it is aperiodic in the case of the document 1c.

Figure 6:
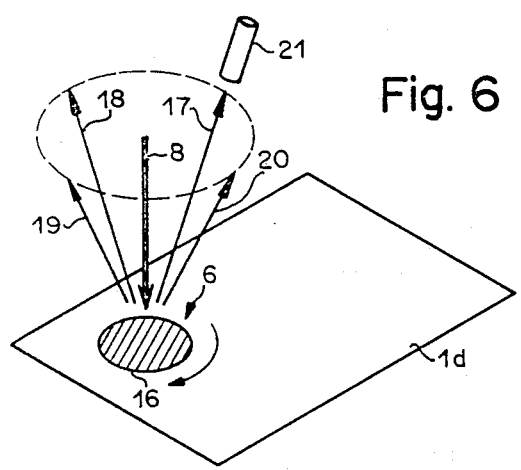
FIG. 6 is a perspective view of a light sensor scanning the document.

In FIG. 6 there is shown a document 1d, which has a microstructure 6 in the form of a circular surface, which may be formed by a single hologram 16, which splits the light beam 8 impinging thereon at right angles by diffraction into several partial beams 17 through 20, and wherein the beam 17 through 20, for example, may lie along a conical surface. Upon rotation of the document 1d around the axis of the hologram 16, which coincides with the axis of the light beam 8, the partial rays 17, 18, 19 and 20, are detected by a light sensor 21. In this case, there also appear in a predetermined time sequence diffraction maxima in at least one predetermined direction.

Figure 7:
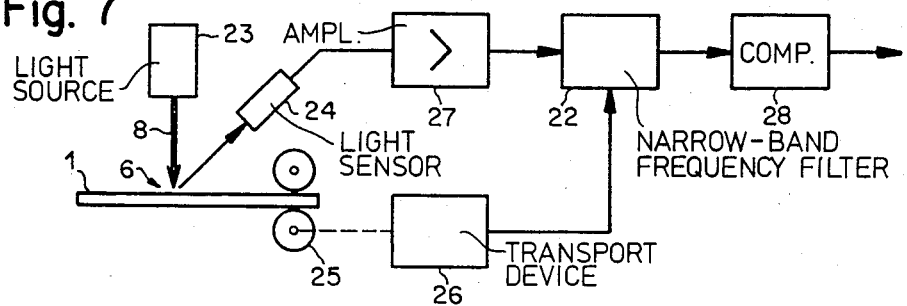
FIG. 7 is a block schematic diagram of a first version of a testing arrangement.

In the case of a periodic sequence, but of an unknown phase position of the effective components of the electrical signals to be selectively detected and provided by the light sensor, the comparison of the time sequence of the electrical signals with the desired sequence is preferably accomplished with the aid of a narrow-band frequency filter 22, shown in FIG. 7. A light source 23 passes a light beam 8, according to FIG. 7, into the read device, the light beam having a small cross-section, and a predetermined wavelength, which impinges on a partial surface of the microstructure 6 of the document 1. At least one light sensor 24 is disposed at a predetermined spatial angle with the surface of the document 1, which corresponds to a possible diffraction angle. Transport rolls 25 of a transport device 26 move the document 1 at an angle transverse to the light beam 8, for example, at right angles, so that the microstructure 6 is continuously scanned. Advantageously the transport device 26 controls the frequency filter 22 in such a manner, that its center pass-frequency is automatically adjusted to the instantaneous scanning velocity, so that the influence of any variation of the transport velocity is eliminated. The light sensor 24 is postcoupled to a detection channel consisting of an amplifier 27, the frequency filter 22 and a comparator 28.

The electrical signals of the light sensor 24, which consists of very weak effective components, and strong disturbing components, are amplified in the amplifier 27 and passed to the frequency filter 22. At the output of the frequency filter 22 there is built up a voltage, if the frequency of the effective components of the signal corresponds to the pass frequency of the frequency filter 22, and if these effective components are summed. Any disturbing components do not, however, contribute any significant amount to the output voltage of the frequency filter 22, as they consist primarily of other frequency components. The comparator 28 provides a YES signal, if the output voltage of the frequency filter 22 exceeds a certain threshold value.

Figure 8:
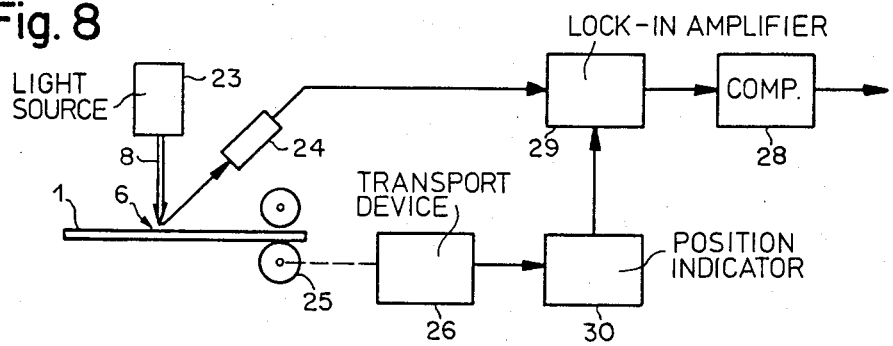
FIG. 8 is a block schematic diagram of a second version of a testing arrangement.

If the time sequence of the effective components to be detected is periodic, and their phase position is also known, then comparison with the desired sequence is advantageously accomplished by means of a phase sensitive lock-in amplifier, for example, known from the publication T351-15 M-8/75-CP of the Princeton Applied Research Corporation, which is denoted in FIG. 8 with the reference numeral 29. In FIG. 8 the same reference numerals as those in FIG. 7 denote equal parts. The signal input of the lock-in amplifier 29 is connected to the light sensor 24, and a control input thereof is connected to a position indicator 30. The output of the lock-in amplifier 29 is connected to the comparator 28. The position indicator 30 supplies control signals, which correspond to the required sequence, and are precisely synchronized with the instantaneous position of the document 1 disposed below the light ray 8. In FIG. 8 the synchronization is indicated by a dashed line between the transport device 26 and the position indicator 30. It can be implemented, for example, by scanning of the front edge of the document 1, or by scanning of any synchronization marks present on the document 1.

The electrical signals supplied by the light sensor 24 are first amplified as an alternating current in the lock-in amplifier 29, and subsequently switched in their polarity exactly in the rhythm of the desired sequence in such a manner that each positive or negative effective signal peak supplies, for example, a positive value to the output signal of the lock-in amplifier 29, while any disturbing signals superimposed upon one another have no definite phase relationship to the switching rhythm, so that they supply within a sufficiently long-term interval an equal amount of positive and negative contributions to the output voltage, and therefore cancel one another, their average value being zero. The output voltage is a measure of the correlation of the holographically stored sequence and of the desired sequence.

Figure 9:
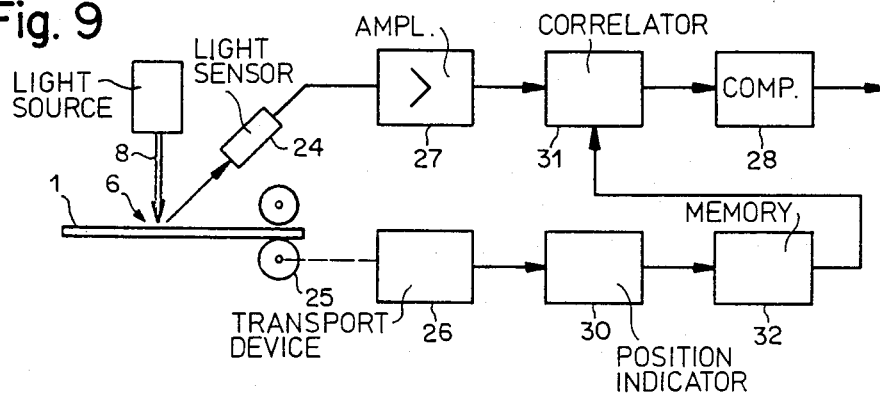
FIG. 9 is a block schematic diagram of a third version of a testing arrangement.

Finally, if the time sequence of the effective components to be detected is aperiodic, then a comparison with the desired sequence is advantageously accomplished by means of an electronic correlator 31, whose first input in the read device, according to FIG. 9, is connected to the output of the amplifier 27, and whose second input is connected to a memory 32. The desired sequence is stored in the memory 32, which is controlled by the position indicator 30, and supplies a comparison signal to the correlator 31 corresponding to the desired sequence, and which is again precisely synchronized to the instantaneous position of the document 1 disposed below the light beam 8. The output of the correlator 31 is connected to the input of the comparator 28.

Similar to the arrangement in the lock-in amplifier 29 of FIG. 8, the effective components of the electrical signal generated by the light sensor 24, which correspond to the desired sequence, are amplified in the correlator 31, while any disturbing components are suppressed.

If the microstructure 6 is of a type that diffraction maxima occur along several spatial angles, then a light sensor can be disposed along each of these spatial angles, and whose electrical signals are analyzed in a detection channel in the manner described for FIGS. 7 through 9, and wherein the output signals of the different detection channels are connected in a logic circuit in such a manner that the document is considered genuine, if several of the detection channels supply a YES signal.

Figure 10:
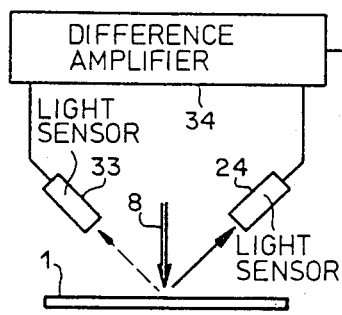
FIG. 10 is a more detailed block schematic diagram of a detail of the testing arrangement.

It is also possible to connect the signals of various light sensors to one another, and to supply the signals subsequently to a detection channel. This is shown, for example, in FIGS. 10 and 11. In the arrangement according to FIG. 10, the light sensor 24 is again arranged in a spatial angle with respect to the document 1, which corresponds to a possible diffraction maximum. A further light sensor 33 receives light scattered from the document 1 at a spatial angle where no diffraction maximum is expected. A difference amplifier 34 forms the difference of the electrical signals of the light sensors 24 and 33. The output of the difference amplifier 34 is connected to the detection channel shown in one of the FIGS. 7, 8 or 9. If the document to be tested does not contain any genuine microstructure, but only, for example, absorbing macroscopic periodic color patterns, which generate reflection changes in a similar sequence to that of a genuine microstructure, the document is nevertheless rejected, because the electrical signals of the two light sensors 24 and 33 are logically cancelled as a result of the difference during a time period under test.

Figure 11:
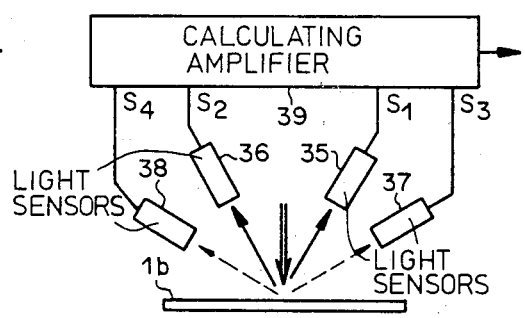
FIG. 11 is a block schematic diagram of another detail of the testing arrangement.

In the arrangement according to FIG. 11, which serves, for example, for testing the authenticity of the document 1 by means of two different holograms 13 and 14 according to FIG. 4, there are provided four light sensors 35 through 38, which are connected to a calculating amplifier or arithmetic unit 39. The output of the calculating amplifier 39 is again connected to the detection channel shown in one of the FIGS. 7, 8 or 9. The light sensor 35, is, for example, disposed along the normal diffraction order of the hologram 13, the light sensor 36 is disposed along the conjugate diffraction order of the hologram 13, the light sensor 37 is disposed along the normal diffraction order of the hologram 14, and the light sensor 38 is disposed along the conjugate diffraction order of the hologram 14. The electrical signals of the light sensors 35 through 38 are denoted by $S_1$ to $S_4$. The calculating amplifier forms from this signal a signal:

$$S = (S_1 + S_2) - (S_3 + S_4), \text{ or } S = \frac{S_1 + S_2}{S_3 + S_4}.$$

the sequence of which corresponds to the sequence of the alternating holograms 13 and 14. By forming a difference or a quotient of the effective signals, any error signal, which may result from color pattern sequences which are not due to light diffraction, are largely suppressed.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A security blank including a substrate having two major surfaces,
   comprising, in combination,
   a transparent thermoplastic layer having a predetermined refraction index as defined by light incident thereon, and being suitable for embossing thereon a machine-readable authenticity feature in the form of an optical microstructure,
   and
   a transparent protective layer having a prearranged refraction index for covering and protecting said microstructure,
   said prearranged refraction index of said transparent protective layer having a value different from said predetermined refraction index of said transparent thermoplastic layer, and
   wherein said microstructure includes means for generating a characteristic diffraction effect from the light incident thereonto, said characteristic diffraction effect being normally detectable by the unaided eye of an observer,
   a surface of the substrate facing said transparent thermoplastic layer including within a region of said microstructure means for producing diffuse reflection characteristics of a predetermined magnitude,
   the difference between said refraction indexes of said transparent layers being sufficiently small, and the magnitude of said diffuse reflection characteristics of the surface of the substrate facing said transparent thermoplastic layer being sufficiently large so that said characteristic diffraction effect of said microstructure is substantially not detectable by the unaided eye of an observer.

2. A security blank as claimed in claim 1, wherein the surface of the substrate within the region of said microstructure has a diffuse reflectivity of at least 80%, and wherein the difference between said refraction indices is at most 0.2.

3. A security blank as claimed in claim 1, wherein said substrate includes paper having a white surface within the region of said microstructure.

4. A security blank as claimed in claim 1, wherein said substrate includes paper having a surface of varying degrees of matteness in different zones thereof.

5. A security blank as claimed in claim 1, wherein said transparent layer has a wavy surface, so as to disperse light impinging on said wavy surface.

6. A security blank as claimed in claim 1, wherein said microstructure includes a plurality of phase diffraction means, each phase diffraction means being sufficiently small in at least one dimension so that it cannot be resolved by the unaided eye of an observer.

* * * * *